US010625423B2

(12) United States Patent
Huat et al.

(10) Patent No.: US 10,625,423 B2
(45) Date of Patent: Apr. 21, 2020

(54) METHOD AND APPARATUS FOR FACILITATING PART VERIFICATION

(71) Applicant: Component Aerospace Singapore Pte. Ltd., Singapore (SG)

(72) Inventors: Sia Chin Huat, Singapore (SG); Max Poh, Singapore (SG); Felix Ng, Singapore (SG); Kanakala Shankar, Singapore (SG); Thangavel Mohan, Singapore (SG)

(73) Assignee: COMPONENT AEROSPACE SINGAPORE PTE. LTD., Singapore (SG)

(*) Notice: Subject to any disclaimer, the term of this patent is extended or adjusted under 35 U.S.C. 154(b) by 240 days.

(21) Appl. No.: 15/784,411

(22) Filed: Oct. 16, 2017

(65) Prior Publication Data
US 2018/0104818 A1    Apr. 19, 2018

(51) Int. Cl.
*B25J 9/16*     (2006.01)
*F01D 25/28*    (2006.01)
*F01D 21/00*    (2006.01)

(52) U.S. Cl.
CPC .......... *B25J 9/1682* (2013.01); *F01D 21/003* (2013.01); *F01D 25/285* (2013.01); *F05D 2220/32* (2013.01); *F05D 2260/83* (2013.01); *G05B 2219/39157* (2013.01); *Y10S 901/44* (2013.01)

(58) Field of Classification Search
USPC ................................................. 700/245–264
See application file for complete search history.

(56) References Cited

U.S. PATENT DOCUMENTS

| 4,590,578 A | * 5/1986 | Barto, Jr. ............ B21J 15/10 318/632 |
| 4,811,253 A | 3/1989 | Johns |
| 4,850,734 A | 7/1989 | Naumec et al. |
| 4,947,666 A | 8/1990 | Hametner et al. |
| 5,017,329 A | 5/1991 | Vermaat |
| 5,222,409 A | 6/1993 | Dalakian |

(Continued)

FOREIGN PATENT DOCUMENTS

DE         4027466 A1    3/1992

OTHER PUBLICATIONS

Intellectual Property Office of Singapore Written Opinion for Application No. 10201608757P, which was filed Oct. 19, 2016. Date of Written Opinion, Feb. 20, 2017.

*Primary Examiner* — Jonathan L Sample
(74) *Attorney, Agent, or Firm* — Carlson, Gaskey & Olds, P.C.

(57) ABSTRACT

A system includes a set of automated arms. Each automated arm includes a holder configured to support a portion of a part, with the set including a quantity of automated arms and holders sufficient for verifying a complex geometry of the part. The automated arms are configured to move the holders into respective verification positions. The system also includes a computing device that includes memory that stores a plurality of predefined automated arm configurations. Each automated arm configuration includes holder verification positions to support portions of a part having a respective complex geometry. The computing device is configured to manipulate the set of automated arms to implement the holder verification positions of a selected one of the automated arm configurations.

20 Claims, 6 Drawing Sheets

(56) References Cited

U.S. PATENT DOCUMENTS

| | | | | |
|---|---|---|---|---|
| 5,312,212 | A | 5/1994 | Naumec | |
| 5,768,792 | A * | 6/1998 | Raab | G05B 19/4207 33/503 |
| 6,126,381 | A | 10/2000 | Bacchi et al. | |
| 6,376,801 | B1 * | 4/2002 | Farrell | B23K 9/1274 219/124.34 |
| 6,532,840 | B2 | 3/2003 | Hatley et al. | |
| 7,784,348 | B2 * | 8/2010 | Dubois | G10K 15/046 73/620 |
| 9,561,594 | B2 * | 2/2017 | Yamaguchi | B25J 9/1697 |
| 2002/0039183 | A1 * | 4/2002 | Yagita | G01N 21/9027 356/240.1 |
| 2003/0177656 | A1 * | 9/2003 | Sawdon | B25J 9/1692 33/645 |
| 2003/0229420 | A1 * | 12/2003 | Buckingham | A61B 1/0055 700/245 |
| 2007/0089545 | A1 * | 4/2007 | Roney, Jr. | F01D 21/003 73/865.8 |
| 2008/0086237 | A1 * | 4/2008 | Rebstock | G05B 19/4189 700/248 |
| 2008/0161971 | A1 * | 7/2008 | Buckingham | B25J 9/06 700/258 |
| 2009/0190826 | A1 * | 7/2009 | Tate | H04N 1/00002 382/153 |
| 2009/0234502 | A1 * | 9/2009 | Ueyama | B25J 9/1697 700/259 |
| 2009/0281662 | A1 * | 11/2009 | Ueyama | B25J 9/1671 700/259 |
| 2010/0030365 | A1 * | 2/2010 | Lilly | B23Q 17/20 700/163 |
| 2012/0048027 | A1 * | 3/2012 | Hashiguchi | B25J 9/0087 73/763 |
| 2013/0151007 | A1 * | 6/2013 | Valpola | B25J 9/1694 700/245 |
| 2014/0121837 | A1 * | 5/2014 | Hashiguchi | B25J 9/0087 700/261 |
| 2014/0236354 | A1 * | 8/2014 | Kamiya | B25J 13/085 700/258 |
| 2014/0365061 | A1 * | 12/2014 | Vasquez | G05D 1/021 701/23 |
| 2015/0019014 | A1 * | 1/2015 | Kim | B25J 9/1697 700/259 |
| 2015/0120051 | A1 * | 4/2015 | Matsuzawa | H01L 41/1132 700/258 |
| 2015/0127159 | A1 * | 5/2015 | Kamiya | G01P 15/18 700/258 |
| 2015/0135459 | A1 * | 5/2015 | Lee | B08B 7/04 15/246 |
| 2015/0202773 | A1 * | 7/2015 | Nagashima | B25J 9/1661 700/264 |
| 2015/0352720 | A1 * | 12/2015 | Iizuka | B25J 9/0084 700/245 |
| 2016/0059419 | A1 * | 3/2016 | Suzuki | B25J 9/1697 700/114 |
| 2016/0067864 | A1 * | 3/2016 | Mullan | B25J 9/1605 700/19 |
| 2016/0082652 | A1 * | 3/2016 | Snyder | G05B 19/4099 264/40.1 |
| 2016/0129594 | A1 * | 5/2016 | Telling | B25J 9/1676 700/255 |
| 2016/0136052 | A1 * | 5/2016 | Koike | A61J 1/22 141/94 |
| 2016/0195390 | A1 * | 7/2016 | Nissen | B25J 9/1676 702/155 |
| 2016/0199975 | A1 * | 7/2016 | Brooks | B25J 9/0081 700/248 |
| 2017/0015004 | A1 * | 1/2017 | Osaka | B25J 13/088 |
| 2017/0050277 | A1 * | 2/2017 | Shi | B25J 9/1682 |
| 2017/0165844 | A1 * | 6/2017 | Brockway | H04N 5/2252 |
| 2017/0270631 | A1 * | 9/2017 | Melikian | B25J 9/1687 |
| 2017/0312875 | A1 * | 11/2017 | Kunihiro | B25J 11/005 |
| 2018/0080882 | A1 * | 3/2018 | Boyer | B25J 9/0018 |

* cited by examiner

METHOD AND APPARATUS FOR FACILITATING PART VERIFICATION

CROSS-REFERENCE TO RELATED APPLICATION

This application claims priority to Singapore Application No. 10201608757P filed on Oct. 19, 2016, the disclosure of which is incorporated by reference herein in its entirety.

TECHNICAL FIELD

The present disclosure relates to automated arms, and more particularly to a method and apparatus for configuring automated arms to facilitate verification of a part.

BACKGROUND

Gas turbine engines include a variety of parts, such as tubes, that have a complex geometry with precise dimensional requirements. For example, a given tube may have a defined length and diameter, and a profile that includes a plurality of curves and/or bends. If a worn tube is repaired (e.g., by welding), it may be desirable to verify that the repaired tube still complies with the dimensional requirements of its design.

In the prior art, technicians seeking to perform such a verification had to manually configure an inspection station for a given tube design, which involved precisely arranging a variety of contact points for a template tube, and then verifying one or more additional tubes against those contact points. For example, contact points may be situated at different locations along the length of the template tube (e.g., respective contact points for different discrete sections of a tube). Once an inspection station was configured, a technician could determine whether a repaired tube placed in the inspection station contacted all of the intended contact points. If some contact points are not contacted, that may be evidence of tube misalignment, for example. The process of manually configuring inspection stations is very time-consuming.

SUMMARY

One example embodiment of a system includes a set of automated arms, each including a holder configured to support a portion of a part, the set including a quantity of automated arms and holders sufficient for verifying a complex geometry of the part, with the automated arms being configured to move the holders into respective verification positions. A computing device includes memory that stores a plurality of predefined automated arm configurations, each of which includes holder verification positions to support portions of a part having a respective complex geometry. The computing device is configured to manipulate the set of automated arms to implement the holder verification positions of a selected one of the automated arm configurations.

In another example embodiment of the above described system, the part is a tube, and each holder includes a groove or pin configured to support a respective portion of the tube.

In another example embodiment of any of the above described systems, the system includes an electronic display operable to display a user interface for receiving automated arm configuration selections from a user.

In another example embodiment of any of the above described systems, each of the automated arms includes a base and a series of arm segments and joints that connect the base to the groove, and each automated arm configuration includes a desired rotational angle for the joints of each of the automated arms.

In another example embodiment of any of the above described systems, the computing device is configured to record a rotational angle of the joints of each of the automated arms as a new automated arm configuration after one or more of the automated arms have been manually manipulated.

In another example embodiment of any of the above described systems, the memory also stores a default automated arm configuration for each of the automated arms, and the computing device is configured to return each of the automated arms to the default automated arm configuration prior to implementing the selected automated arm configuration.

In another example embodiment of any of the above described systems, the set of automated arms includes eight automated arms.

In another example embodiment of any of the above described systems, the set of automated arms includes six automated arms that are situated in an enclosure that includes opposing first and second walls, three of the six arms are mounted to the first wall, and three of the six arms are mounted to the second wall.

In another example embodiment of any of the above described systems, each of the automated arms is operable to move its holder with six degrees of freedom.

In another example embodiment of any of the above described systems, the holder of each automated arm is situated at a first end of the automated arm, and a base of the automated arm is situated at an opposite, second end of the automated arm.

In another example embodiment of any of the above described systems, the part is a component of a gas turbine engine.

One example embodiment of a method of facilitating inspection of a part having a complex geometry includes determining a selected one of a plurality of predefined automated arm configurations, each of which includes automated arm positions for a respective part having a complex geometry. The method includes controlling a set of automated arms, each of which includes a holder configured to support a portion of a part for verification, to situate their respective holders in verification positions based on the automated arm positions of the selected automated arm configuration. The set includes a quantity of automated arms and holders that is sufficient for verifying the complex geometry of the part.

In another example embodiment of the above described method, each automated arm includes a base and a series of arm segments and joints that connect the base to the holder; and the controlling includes determining desired rotational angles for the joints of each automated arm based on the selected automated arm configuration, and articulating the joints of each automated arm to implement the desired rotational angles.

In another example embodiment of any of the above described methods, articulating the joints of each automated arm to implement the desired rotational angles includes staggering movement of the automated arms such that one or more of the automated arms is stationary while one or more other of the automated arms is moving.

In another example embodiment of any of the above described methods, staggering movement of the automated arms includes advancing each of the automated arms to their respective desired rotational angles in stages, and keeping individual ones of the automated arms stationary between their respective stages.

In another example embodiment of any of the above described methods, a rotational angle of each of the series of joints is recorded as a new automated arm configuration after one or more of the automated arms have been manually manipulated.

In another example embodiment of any of the above described methods, the set of automated arms includes six automated arms that are situated in an enclosure that includes opposing first and second walls, three of the six automated arms are mounted to the first wall, and three of the six automated arms are mounted to the second wall.

In another example embodiment of any of the above described methods, the controlling includes returning each of the automated arms from an initial automated arm configuration to a default automated arm configuration prior to implementing the selected automated arm configuration.

In another example embodiment of any of the above described methods, each of the automated arm configurations includes a respective predefined movement path for each holder to follow from the default automated arm configuration to implement the selected automated arm configuration.

In another example embodiment of any of the above described methods, a part is placed into position on at least one of the holders that is in its respective verification position for the selected automated arm configuration, and a verification of whether the part complies with the complex geometry of the selected automated arm configuration is performed based on the placing.

The embodiments described herein may be taken independently or in any combination. Features described in connection with one embodiment are applicable to all embodiments, unless such features are incompatible. The features described above, and other features, may be best understood from the following drawings and detailed description.

DETAILED DESCRIPTION

Figure 1:
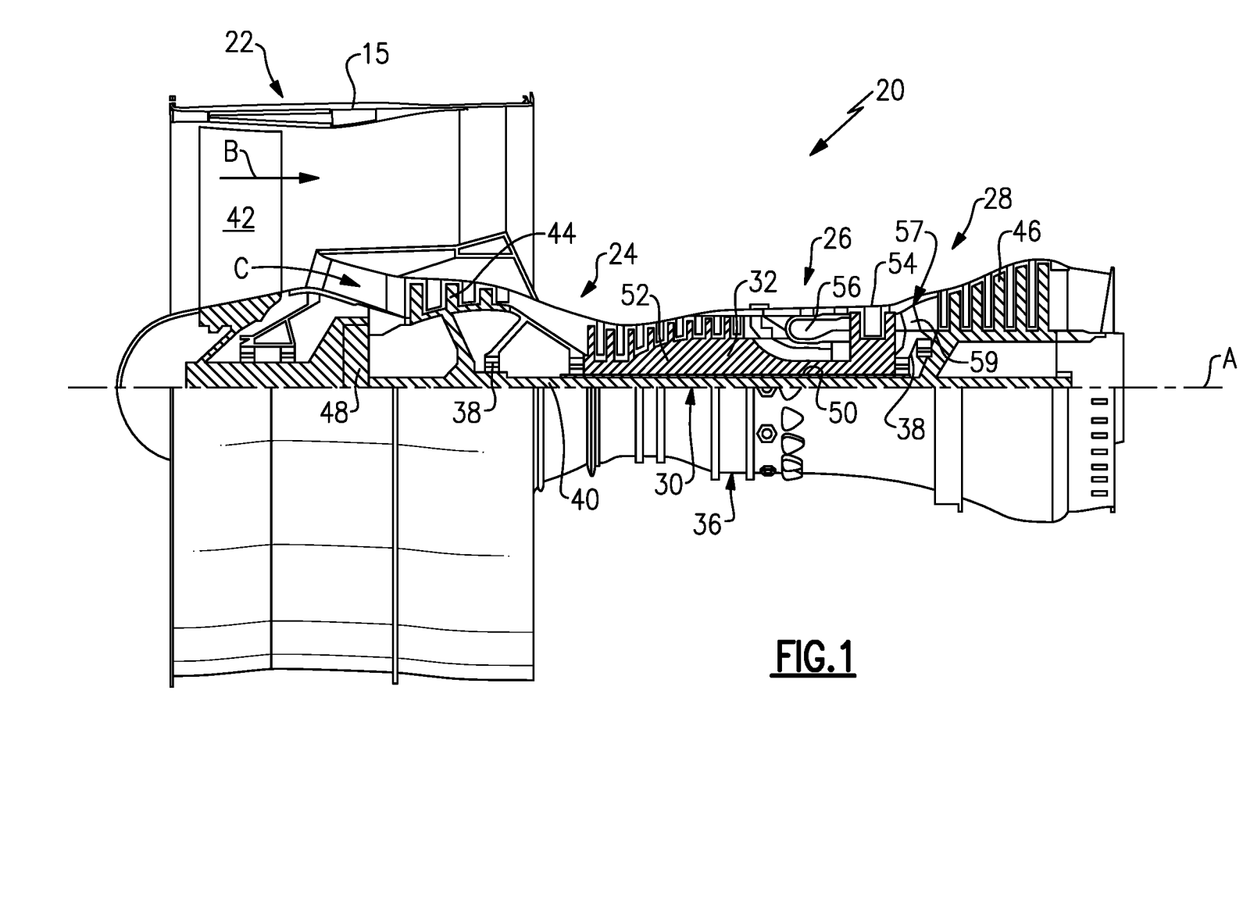
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

The gas turbine engine 20 includes a plurality of parts, such as tubes, that have a respective complex geometry. A part exhibiting a complex geometry will have portions that that exhibit at least three different angles relative to each other (e.g., through curves or bends). In some examples, gas turbine engines 20 will include 400 or more tubes. The tubes may be used for cooling, pressurizing hydraulic actuators, transporting fuel, or transporting lubricant for the gas turbine engine 20, for example. The tubes may be located in the fan section 22, compressor section 24, combustor section 26, turbine section 28, or a combination thereof.

Figure 2:
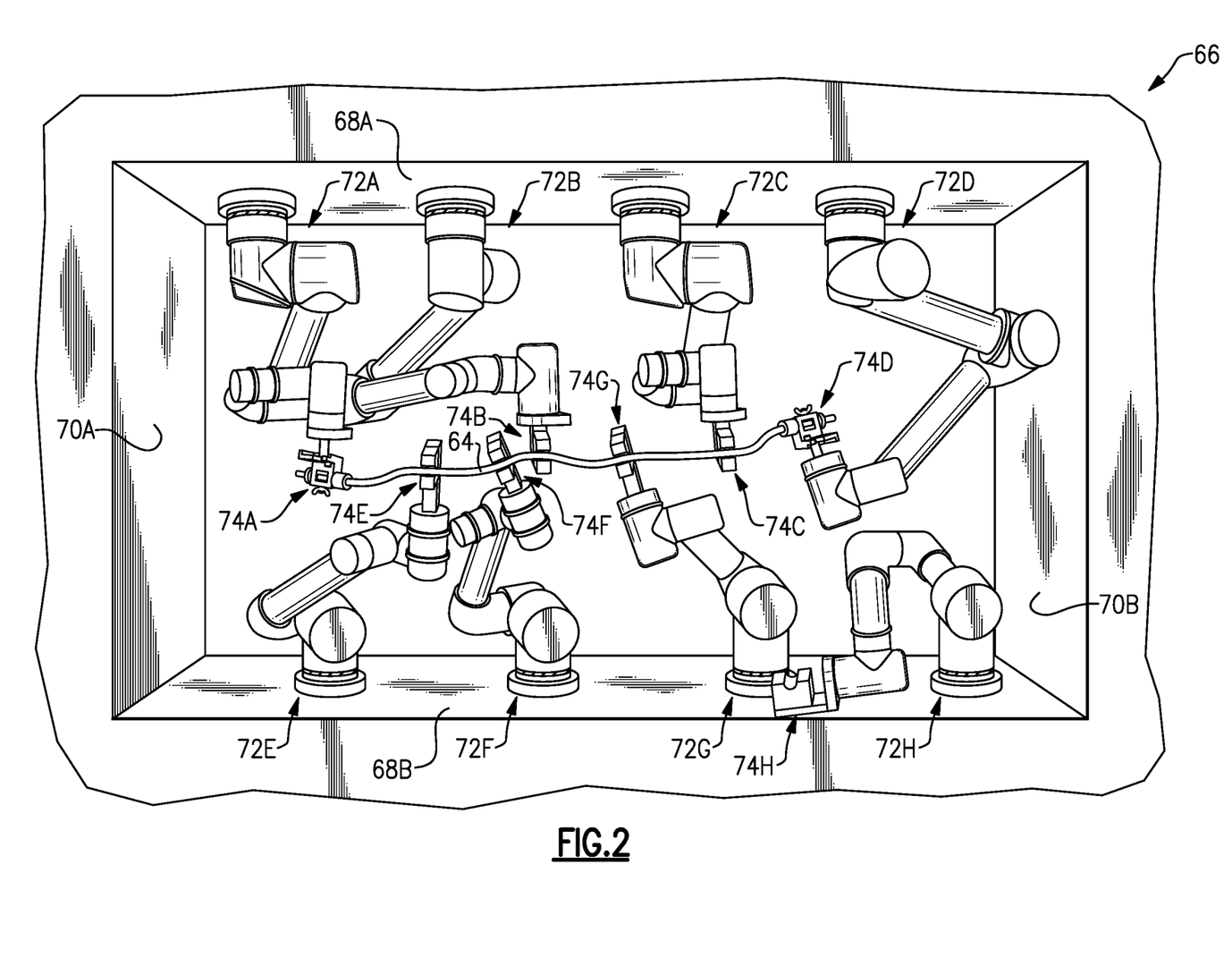
FIG. 2 schematically illustrates an example system for part inspection.

One example tube 64 is shown in FIG. 2. The example tube 64 shown in FIG. 2 has a complex geometry, as it has portions that exhibit at least three different angles relative to each other (see, e.g., portions held by holders 74A, 74E, 74F, 74B). Although the tube 64 of FIG. 2 has a particular unique complex geometry, in the discussion below reference numeral 64 will be used generically to refer to tubes having a complex geometry for which verification is desired.

FIG. 2 schematically illustrates an example system 66 for inspecting tubes 64 of gas turbine engine 20. The system 66 includes a set of eight automated arms 72A-H, each comprising a respective holder 74A-H at its distal end. Each holder 74 is sized to support a specific portion of a tube 64 in a manner that confirms whether the specific portion of the tube 64 complies with its dimensional and/or geometric requirements. The automated arms 72 are configured to automatically move the holders 74 relative to each other to implement predefined automatic arm configurations in response to user selection of a particular configuration.

The example of FIG. 2 shows a particular automated arm configuration in which arms 72A-G are configured to hold tube 64, and arm 72H is not utilized. If a technician is able to situate the tube 64 such that respective intended portions of the tube 64 are supported by each of the holders 74A-G, then the tube would pass verification. Conversely, if an intended portion of the tube 64 could not be supported by its intended holder 74, then the tube 64 would fail verification because the tube would not fulfill its geometric or dimensional requirements.

Although FIG. 2 illustrates eight automated arms 72, fewer automated arms 72 could be included in the system 66 (e.g., 4-7). Alternatively, some embodiments include a greater number of automated arms 72 in system 66 (e.g., 9-20 automated arms 72). In some embodiments, each of the automated arms 72 is operable to move its holder 74 with six degrees of freedom.

The system 66 includes an enclosure comprising an upper wall 68A, a lower wall 68B, and opposing sidewalls 70A-B. In the example of FIG. 2, four of the automated arms 72A-D are mounted to upper wall 68A, and four of the automated arms 72E-H are mounted to lower wall 68B. In other examples, some or all of the arms 72 could be mounted to the sidewalls 70.

Figure 3:
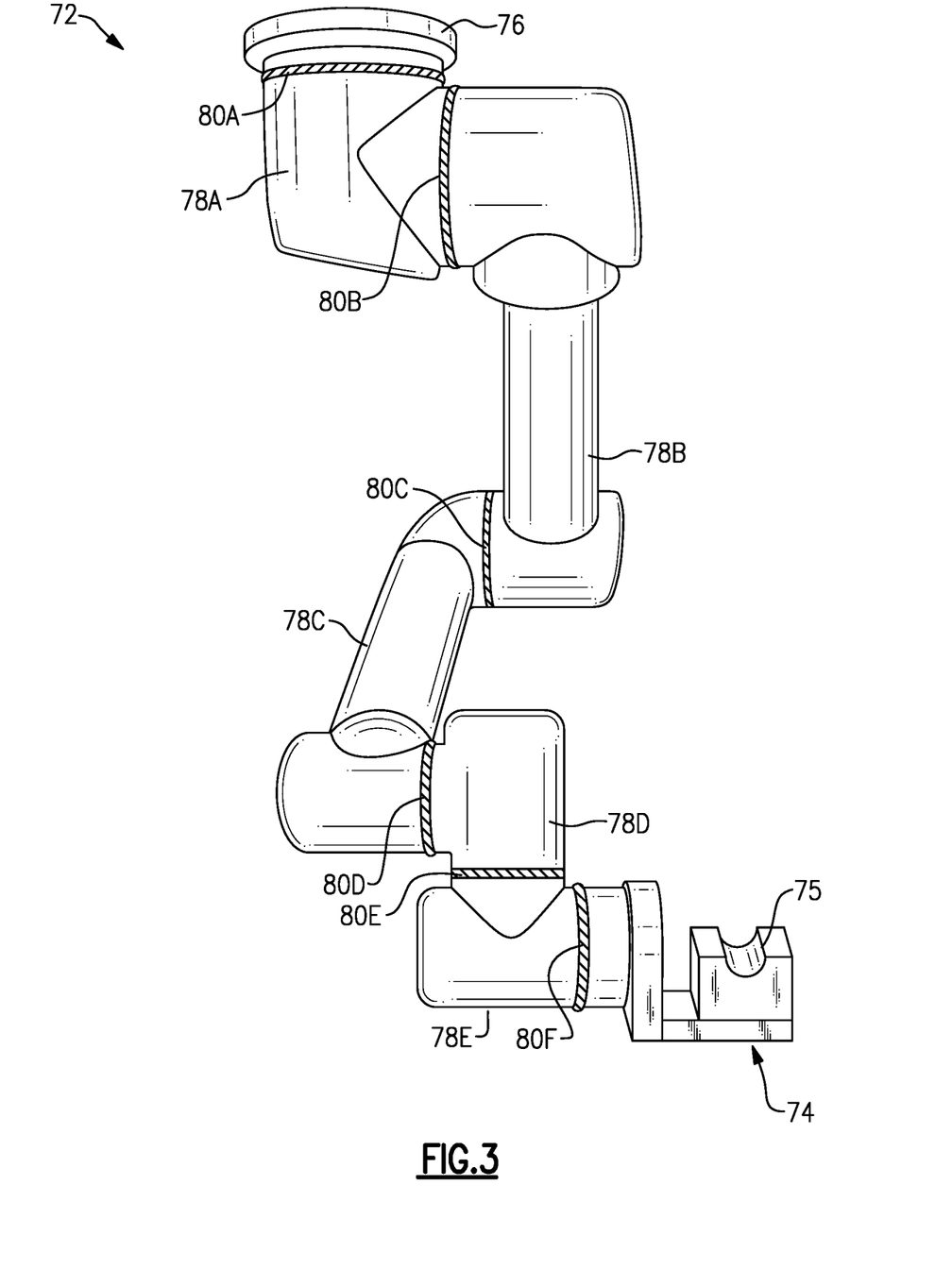
FIG. 3 schematically illustrates an example automated arm which includes a first type of holder for supporting a portion of a tube.

FIG. 3 schematically illustrates an example automated arm 72, which includes a first type of holder 74 for supporting a portion of a tube 64. The holder 74 shown in FIG. 3 includes a groove 75 that is sized to receive a portion of tube 64. In the example of FIG. 3, the automated arm 72 is a robotic arm and its holder 74 comprises an end effector.

The example automated arm 72 includes a base 76, and a series of arm segments 78A-E and joints 80A-F between the base 76 and the holder 74. This is only an example and different quantities of arm segments 78 and joints 80 could be used for the automated arms 72.

Figure 4A:
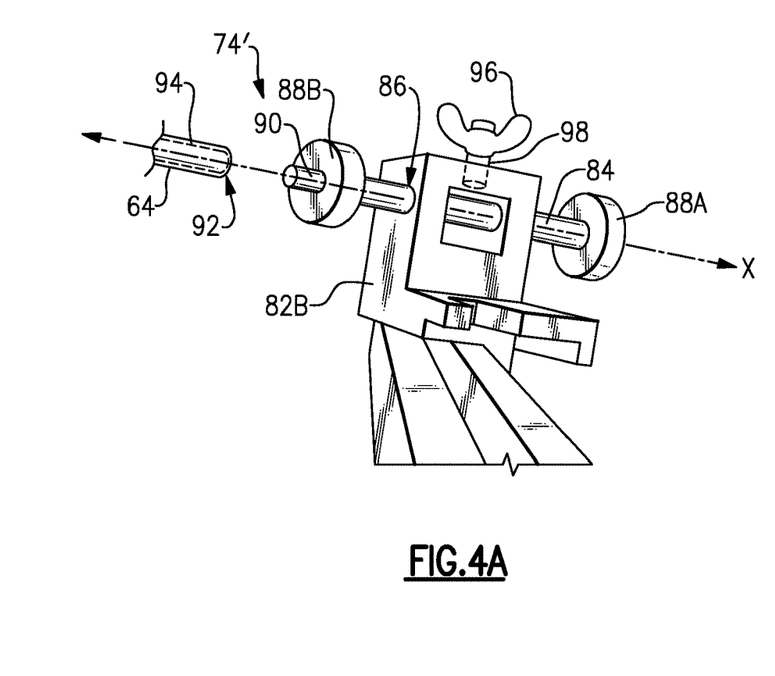
FIGS. 4A-B schematically illustrate a second type of holder that can be used on an automated arm for supporting a portion of a tube.
Figure 4B:
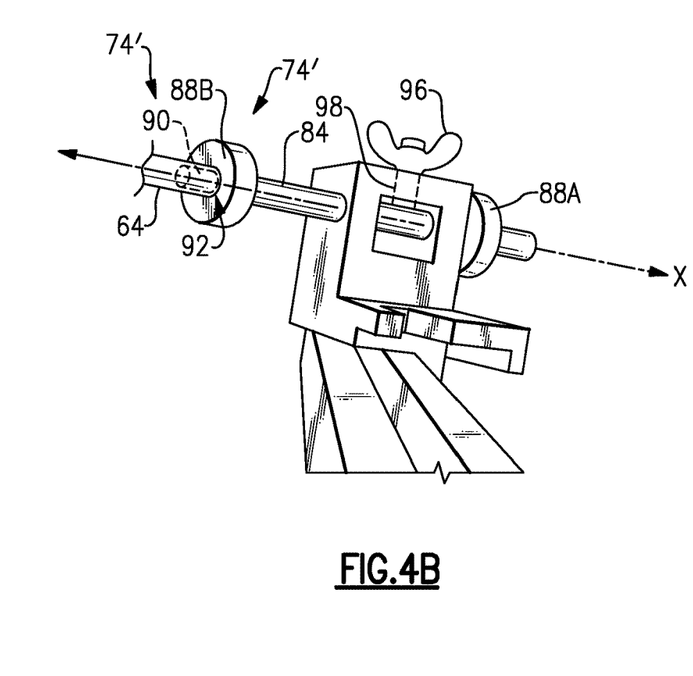

FIGS. 4A-B schematically illustrate a second type of holder 74' that can be used for supporting a portion of a tube 64. In particular, the holder 74' of FIG. 4A comprises an alternate end effector that may be used to hold terminal ends of the tube 64. The holder 74' includes a shaft 84 that is movable along an axis X from a first position shown in FIG. 4A to a second position shown in FIG. 4B. The shaft 84 is movable within a correspondingly shaped passage 86 within holder 74'. In this example the shaft 84 and passage 86 are cylindrical. Stoppers 88A-B are mounted on opposing ends of the shaft 84 to prevent the shaft 84 from exiting the passage 86. Stopper 88B includes a pin 90 that is sized for insertion into an internal passage 94 of tube 64. Stopper 88B is configured to receive end 92 of tube 64 onto the pin 90. Thus, while the example groove 75 of holder 74 in FIG. 3 receives a portion of tube 64 into a groove 75, the holder 74' of FIG. 4 includes a pin 90 that is received into the tube 64.

In FIG. 4B, the shaft 84 has been moved to the left, and the pin 90 has been fully inserted into the tube 64. Also, in FIG. 4B, wing nut 96 has been rotated to advance bolt 98 toward the shaft 84, to maintain the shaft 84 in its current position. Use of the second type of holder 74' at the ends of tube 64 can provide a useful location feature by holding the tube 64 in place while a technician examines the extent to which intended portions of the tube 64 are supported by the holders 74.

In some examples, the groove 75 and pin 90 are designed according to the tolerance of a given tube 68. For example, the grooves 75 may be created to be slightly wider than the respective tube portions they are intended to accommodate and the pins 90 may be slightly narrower than the passages 94 they are intended to be inserted into, so that during verification a tube 64 that deviates slightly from a template tube but is still within tolerance can still pass verification.

Figure 5:
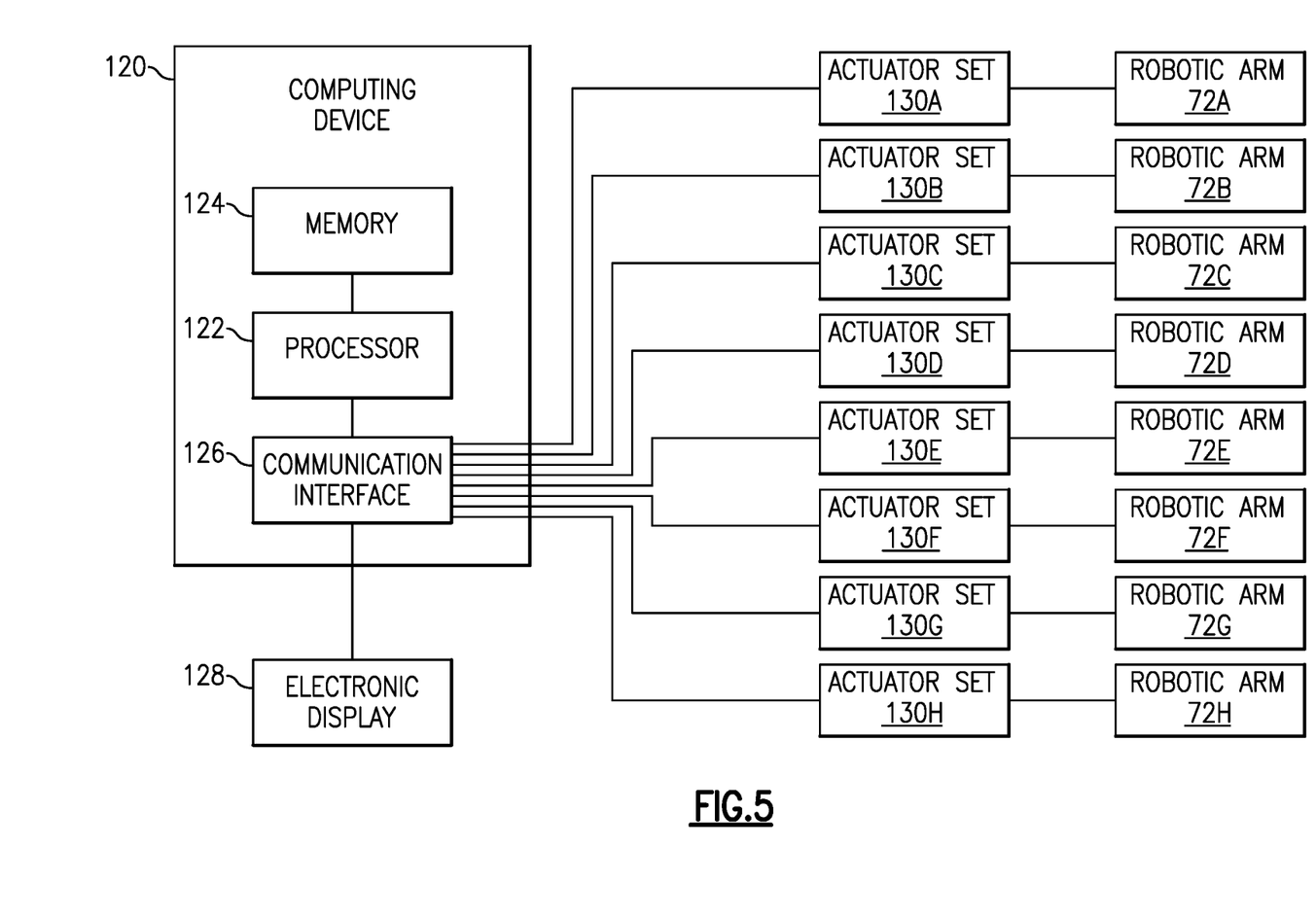
FIG. 5 schematically illustrates a computing device configured to control a plurality of automated arms.

FIG. 5 schematically illustrates a computing device 120 configured to control the plurality of automated arms 72. The computing device 120 may be a programmable logic controller (PLC) for example. The computing device 120 includes a processor 122 that comprises hardware, such as one or more processing circuits that may include one or more microprocessors, microcontrollers, application specific integrated circuits (ASICs), or the like, for example. The computing device 120 also includes memory 124, which may include one or several types of memory such as read-only memory (ROM), random-access memory, cache memory, flash memory devices, optical storage devices, etc. The memory 124 stores a plurality of predefined automated arm configurations, each of which corresponds to a respective tube design. The memory 124 also stores program instructions that are executable by processor 122 in a manner that the computing device 120 controls the automated arms 72 to automatically move into a selected automated arm configuration.

A communication interface 126 is operatively connected to the processor 122 and is configured to facilitate communication with other devices, such as an electronic display 128 that is operable to display a user interface for receiving automated arm configuration selections from a user. In one or more embodiments, the user interface comprises a touch screen interface. Other user interfaces could be used (e.g., a mouse, keyboard, or other input device instead of a touch screen) for facilitating user input to the computing device 120. In one example, the user may select an automated arm configuration by part number, by part name, or by a visual display showing the part. The communication interface 126 may support wired or wireless communication for example.

The communication interface 126 operatively connects the computing device 120 to a plurality of actuator sets 130A-H. Each actuator set 130 is operable to manipulate its associated automated arm 72 by adjusting positions or angles of the arm segments 78 at the joints 80 of the automated arm 72. Other adjustments could be used in some examples, such as extending or retracting portions of the automated arm 72. Each actuator set 130 shown in FIG. 5 may include one or more actuators. In some examples, each actuator set 130 includes at least one actuator for each of the joints 80 in its associated robotic arm 72.

The computing device 120 is configured to control the set of automated arms 72A-H according to a selected one of the automated arm configurations stored in memory 124. In some embodiments, each automated arm configuration comprises a desired rotational angle for the joints 80 of each of the automated arms 72. Those angles place the groove 75 of holder 74 or pin 90 of holder 74' into a verification position where the holder establishes or defines a location where a corresponding portion of the tube 64 will be if the tube is correctly configured. Also, in some examples, each automated arm configuration comprises a respective predefined movement path for each holder 74 to follow to move into a verification position. The automated arm configuration may also include a movement sequence, and each movement path may include one or more intermediate positions at which the automated arm 72 pauses before further advancing its holder 74 closer to its intended position, which could be helpful in avoiding collisions between automated arms 72.

In some examples, each predefined movement path starts from a default home automated arm configuration to which the computing device 120 returns the automated arms 72 prior to implementing a newly selected automated arm configuration. For example, if the automated arms are configured for inspecting a first tube design, and a user selects a different tube design, instead of having the automated arms immediately adjust directly to the second tube design, the computing device 120 may return the automated arms 72 to the default home automated arm configuration as a preliminary step.

In some examples, each actuator set 130 includes associated sensors (not shown) that can detect the precise position of their associated portions of the automated arm 72. In some examples, the sensors provide feedback to the computing device 120 to detect a current position of the automated arms.

In some examples, the computing device 120 is configured to use such sensors to record a rotational angle of the joints 80 of each of the automated arms 72 as part of a new or modified automated arm configuration after one or more of the automated arms 72 have been manually manipulated. Thus, if a technician wanted to create a new configuration for a new tube 64, they could manually move the automated arms 72 so that the new tube 64 is supported by the holders 74, and the computing device 120 could then record the rotational angles of each automated arm 72 as a new automated arm configuration. In some examples, the technician can record intermediate positions for the various automated arms as part of the new automated arm configuration. The computing device 120 would advance the automated arms 72 to those respective intermediate positions from an initial automated arm configuration as part of moving the automated arms 72 into position according to the new automated arm configuration.

Figure 6:
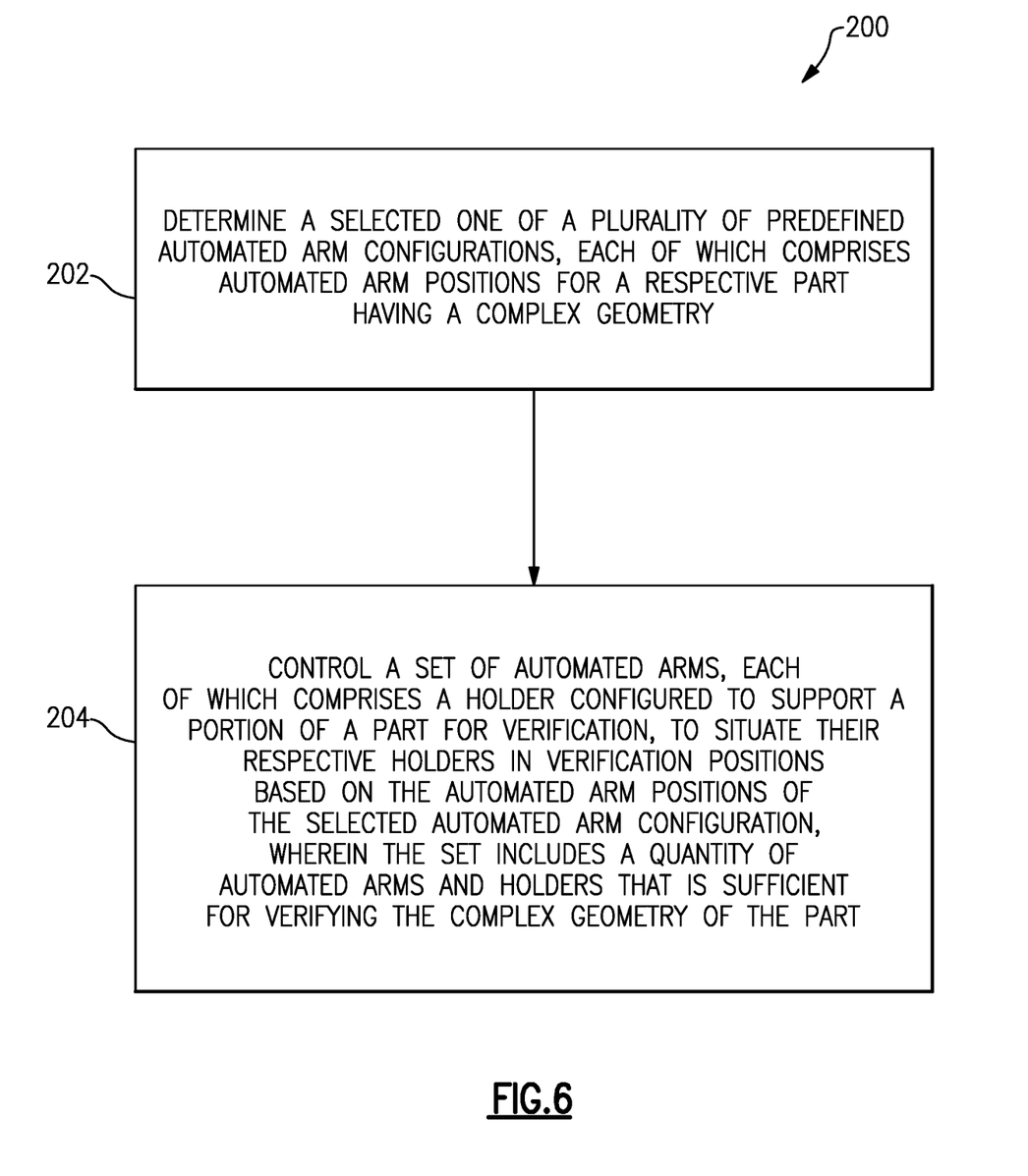
FIG. 6 is a flowchart summarizing a method of facilitating inspection of a tube.

FIG. 6 is a flowchart summarizing a method 200 of facilitating part inspection, which in some examples includes tube inspection. In some examples, the method is performed by computing device 120. Computing device 120 determines a selected one of a plurality of predefined automated arm configurations (step 202). The selection is received from a user, such as technician, for example. Each automatic arm configuration includes automated arm positions for a respective part having a complex geometry (such as tube 64). The computing device 120 controls a set of automated arms 72, each of which comprises a holder 74 configured to support a portion of a part for verification, to situate their respective holders 74 in verification positions based on the automated arm positions of the selected automated arm configuration (step 204). The set includes a quantity of automated arms 72 and holders 74 that is sufficient for verifying the complex geometry of the part (e.g., at least four automated arms 72, at least six automated arms 72, or at least eight automated arms 72).

Subsequently, a technician may place a part (such as tube 64) into position on at least one of the holders 74 that is in its respective verification position for the selected arm configuration, and verify whether the part complies with the complex geometry of the selected automated arm configuration based on the placement.

As discussed above, each automated arm 72 comprises a base 76 and a series of arm segments 78 and joints 80 that connect the base 76 to the holder 74. In some examples, the controlling of step 202 includes determining desired rotational angles for the joints 80 of each automated arm 72A-H based on the selected automated arm configuration, and articulating the joints 80 of each automated 72A-H arm to achieve the desired rotational angles.

In some examples, articulating the joints of each automated arm 72 to implement the desired rotational angles comprises staggering movement of the automated arms 72 such that one or more of the automated arms 72 is stationary while one or more other automated arms 72 is moving (e.g., through one or more intermediate positions). The staggered movements may be performed according to a movement sequence, for example. Staggering movement of the automated arms may include advancing each of the automated arms to their respective desired rotational angles in stages, and keeping individual ones of the automated arms stationary between their respective stages. In this fashion, each arm may have one or more intermediate positions for its holder 74 at which the holder 74 briefly remains stationary on its way to its ultimate position and orientation. The use of staggered movements, intermediate positions, movement paths, and movement sequences, either individually or in combination with each other can minimize a risk of collisions between the automated arms 72.

In some examples, as part of the controlling of step 204, the computing device 120 returns each automated arm 72 to its default home automated arm configuration prior to implementing a selected automated arm configuration. For example, if a the automated arms 72 are configured for inspecting a first tube design, and a user selects a different tube design, instead of having the automated arms immediately advance directly to the second tube design, the computing device 120 may return the automated arms 72 to a default home configuration. This too could help avoid collisions between the automated arms 72.

The techniques discussed herein provide a number of improvements over the prior art. For example, once an automated arm configuration is saved, it can be quickly recalled in a matter of seconds or minutes, instead of requiring a technician to painstakingly recreate a tube verification setup with non-automated arms. The limitations of the prior art forced technicians to either perform time-consuming manual reconfigurations repeatedly, or leave many setups in place even when not in use, which would require a large storage area for backup configurations. The automated system described above addresses both of these limitations by removing the time constraints of manual configuration, and removing the storage requirements of having many setups that are not in use.

Although the techniques discussed above have been discussed in the context of inspecting a tube from a gas turbine engine, it is understood that this is only an example, and that automated arm configurations corresponding to designs not associated with a tube and/or not associated with a gas turbine engine could also be used.

Although example embodiments have been disclosed, a worker of ordinary skill in this art would recognize that certain modifications would come within the scope of the claims. For that reason, the following claims should be studied to determine their true scope and content.

What is claimed is:

1. A system, comprising:
   a set of automated arms, each comprising a holder configured to support a specific portion of a part, the set including a quantity of automated arms and holders sufficient for verifying a complex geometry of the part, the automated arms being configured to move the holders into respective verification positions; and
   a computing device comprising memory that stores a plurality of predefined automated arm configurations, each of which comprises holder verification positions to support specific portions of a part having a respective complex geometry, the computing device being configured to manipulate the set of automated arms to implement the holder verification positions of a selected one of the automated arm configurations.

2. The system of claim 1, wherein the part is a tube, and each holder comprises a groove or pin configured to support a respective portion of the tube.

3. The system of claim 1, comprising:
   an electronic display operable to display a user interface for receiving automated arm configuration selections from a user.

4. The system of claim 1, wherein each of the automated arms comprises a base and a series of arm segments and joints that connect the base to the holder, and each automated arm configuration comprises a desired rotational angle for the joints of each of the automated arms.

5. The system of claim 4, wherein the computing device is configured to record a rotational angle of the joints of each of the automated arms as a new automated arm configuration after one or more of the automated arms have been manually manipulated.

6. The system of claim 1, wherein the memory also stores a default automated arm configuration for each of the automated arms, and wherein the computing device is configured to return each of the automated arms to the default automated arm configuration prior to implementing the selected automated arm configuration.

7. The system of claim 1, wherein the set of automated arms comprises eight automated arms.

8. The system of claim 1:
   wherein the set of automated arms includes six automated arms that are situated in an enclosure comprising opposing first and second walls; and
   wherein three of the six arms are mounted to the first wall, and three of the six arms are mounted to the second wall.

9. The system of claim 1, wherein each of the automated arms is operable to move its holder with six degrees of freedom.

10. The system of claim 1, wherein the holder of each automated arm is situated at a first end of the automated arm, and a base of the automated arm is situated at an opposite, second end of the automated arm.

11. The system of claim 1, wherein the part is a component of a gas turbine engine.

12. A method of facilitating inspection of a part having a complex geometry, the method comprising:
   determining a selected one of a plurality of predefined automated arm configurations, each of which comprises automated arm positions for a respective part having a complex geometry; and
   controlling a set of automated arms, each of which comprises a holder configured to support a portion of a part for verification, to situate their respective holders in verification positions based on the automated arm positions of the selected automated arm configuration, wherein the set includes a quantity of automated arms and holders that is sufficient for verifying the complex geometry of the part;
   wherein said determining and controlling are performed by a computing device.

13. The method of claim 12:
   wherein each automated arm comprises a base and a series of arm segments and joints that connect the base to the holder; and
   wherein the controlling comprises determining desired rotational angles for the joints of each automated arm based on the selected automated arm configuration, and articulating the joints of each automated arm to implement the desired rotational angles.

14. The method of claim 13, wherein articulating the joints of each automated arm to implement the desired rotational angles comprises staggering movement of the automated arms such that one or more of the automated arms is stationary while one or more other of the automated arms is moving.

15. The method of claim 14, wherein staggering movement of the automated arms comprises advancing each of the automated arms to their respective desired rotational angles in stages, and keeping individual ones of the automated arms stationary between their respective stages.

16. The method of claim 13, comprising:
recording a rotational angle of each of the series of joints as a new automated arm configuration after one or more of the automated arms have been manually manipulated.

17. The method of claim 12:
wherein the set of automated arms includes six automated arms that are situated in an enclosure comprising opposing first and second walls; and
wherein three of the six automated arms are mounted to the first wall, and three of the six automated arms are mounted to the second wall.

18. The method of claim 12, wherein the controlling comprises:
returning each of the automated arms from an initial automated arm configuration to a default automated arm configuration prior to implementing the selected automated arm configuration.

19. The method of claim 18, wherein each of the automated arm configurations comprises a respective predefined movement path for each holder to follow from the default automated arm configuration to implement the selected automated arm configuration.

20. The method of claim 12, comprising:
placing a part into position on at least one of the holders that is in its respective verification position for the selected automated arm configuration; and
verifying whether the part complies with the complex geometry of the selected automated arm configuration based on the placing.

* * * * *